United States Patent Office 3,523,755
Patented Aug. 11, 1970

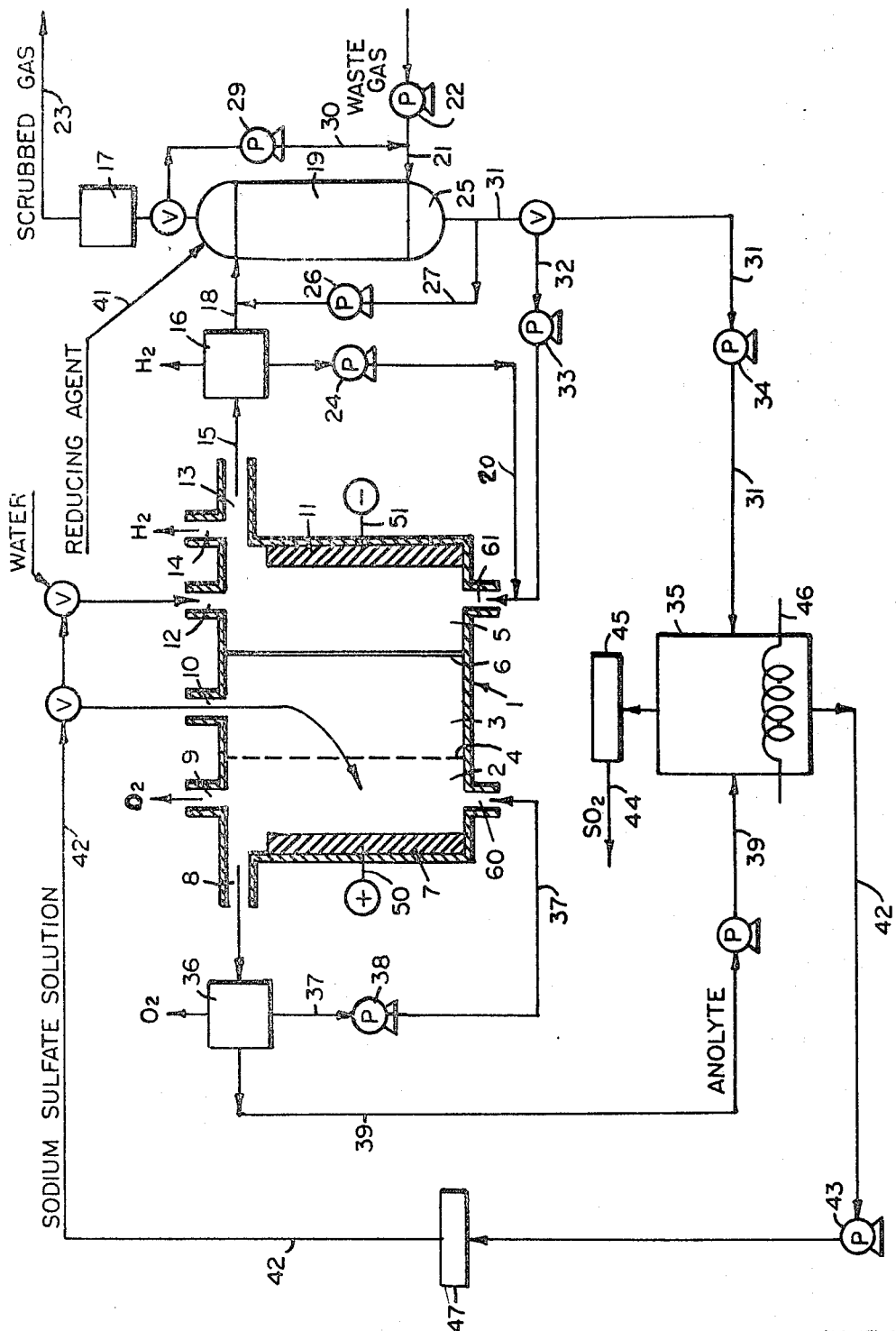

1

3,523,755
PROCESSES FOR CONTROLLING THE pH OF SULFUR DIOXIDE SCRUBBING SYSTEM
Wayne A. McRae, Lexington, Mass., assignor to Ionics, Incorporated, Watertown, Mass.
Filed Apr. 1, 1968, Ser. No. 717,766
Int. Cl. C01b *17/56;* B01d *13/02;* B01k *3/00*
U.S. Cl. 23—178                                    10 Claims

ABSTRACT OF THE DISCLOSURE

This invention is directed to a continuous cyclic process for the absorption of sulfur dioxide as bisulfite into an alkailne solution from a gas containing minor amounts of sulfur dioxide and oxygen and/or other oxidants with subsequent recovery of a concentrated sulfur dioxide gas stream. Reducing agents such as sodium dithionite are added to the sulfur dioxide absorbing alkaline solution to control the pH of the system and also to prevent loss of recoverable sulfur dioxide from the undesired oxidation of said sulfur dioxide which oxidation otherwise generally occurs within the absorber. Suitable reducing agents are those which will preferentially react with and remove dissolved oxygen present in the alkaline solution to form bisulfite. The reducing agent consumed may be reformed by electrolytically reducing bisulfite in the cathode compartment of an electrolytic cell with the resulting reformed reducing agent recycled for additional oxygen removal. Alternatively the pH of the system is controlled by adding lime and soda ash equivalent to the amount of sulfur dioxide oxidized or by crystallizing sulfate salts out of part of the electrolytic cells' anolyte bisulfate solution thereby removing and recovering sulfuric acid from the system.

This invention relates to apparatus and processes for the removal of an acidic gas such as sulfur dioxide from a gaseous mixture and its subsequent recovery as a concentrated sulfur dioxide gas stream. In particular it concerns controlling the pH of aqueous solutions employed in an electrolytic scrubbing system to prevent excessive acid build-up therein. Specifically, it relates to the use of easily oxidized agents for the purpose of removing residual oxygen and/or other oxidants from the scrubber system thereby reducing or preventing the oxidation of sulfur dioxide into bisulfate. Further, it also relates to the removal of excess acidity as sulfuric acid through a crystallization-evaporation process and/or treatment with lime and a carbonate salt.

In copending application Ser. No. 625,149 filed Mar. 22, 1967, now U.S. Pat. No. 3,475,122, there are disclosed, inter alia three compartment electrolytic salt conversion cells which are employed for removing sulfur dioxide from a gas containing minor amounts of sulfur dioxide with subsequent recovery of the valuable sulfur dioxide for eventual conversion into sulfuric acid.

The main components of such three compartment electrolytic cells are arranged in the order of an anode, an anode compartment, a porous diaphragm, a center compartment, a cation-transfer membrane, a cathode compartment and a cathode. Liquid flow directing spacers provide the compartments and also provide the required gasketing and separation of the components. A hydraulically nonporous cation-transfer membrane is used so that the liquid flowing through the cathode compartment can be independently controlled. The nonporous cation membrane prevents physical mixing of the catholyte and center compartment streams, making it easy to control the concentration of caustic generated in the catholyte. Essentially, only base forming cations (and electroosmotic water) from the center compartment pass through the cation membrane to balance the hydroxyl ions produced at the cathode. The center compartment feed stream leaves the center compartment only by passing through the porous diaphragm into the adjacent anode compartment. This constant hydraulic flow through the diaphragm aids in preventing the hydrogen ions produced at the anode from competing with the base cations migrating across the cation-transfer membrane into the cathode compartment. The salt feed stream which enters the center compartment must leave the cell from the anode compartment along with any acid or acid salt produced by the anodic reaction.

The invention disclosed in Ser. No. 625,149, now U.S. Pat. No. 3,475,122, is a continuous, cyclic liquid phase absorption process comprised of four basic steps. The first step employs the above described basic three compartment electrolytic cell (or multicompartment cell apparatus) for converting a center compartment feed solution of a sulfate salt into an alkaline solution and sulfuric acid and/or acid sulfate salt solution. The second step involves the use of a contactor for removal of sulfur dioxide from a gas stream mixture by absorption of sulfur dioxide into the catholytic alkaline solution to form predominantly a bisulfite solution. The third step is directed to neutralizing this laden alkali (bisulfite solution) with the acidic effluent anolyte solution to reform the original sulfate salt. The desorbed sulfur dioxide gas resulting from the neutralization is stripped off and recovered as a concentrated gas stream. In the fourth step the reformed sulfate salt solution is recycled as feed solution to the electrolytic cells where it is once again converted into acidic and alkaline components.

Since equivalent amounts of acidic and alkaline materials are inherently generated at the electrodes of the electrolytic cells there is (under ideal conditions) no necessity for adding or removing chemicals from the overall system except, of course, the sulfur dioxide which is fed into the system as a minor component of a waste gas mixture and recovered from the system as a more concentrated sulfur dioxide stream. In practice however it has been found that the total quantity of sulfur dioxide absorbed by the system from the waste gas is generally greater than the total amount of concentrated sulfur dioxide gas which is subsequently stripped and recovered from the overall system. This difference or loss of recoverable sulfur dioxide gas is due to its oxidation into bisulfate by oxidants in the waste gas mixture or from other sources. For example, 97% of the total sulfur dioxide absorbed into the system may be recovered from the stripper tank as concentrated sulfur dioxide gas with the other 3% being oxidized to the acid salt (e.g., $NaHSO_4$) which remains in the system to upset the stoichiometric balance. Oxidation is possible whenever residual oxygen or other oxidizing agents such as nitrogen oxides or persulfates are available and in contact with or dissolved in the sulfur dioxide containing gas or liquid phases particularly in the presence of catalytic materials. The major source of oxidant entering the system generally comes into the contactor as a component of the sulfur dioxide containing waste gases. It is believed that variable valence metal ions such as V, Fe, Co, Cu, Mn, etc., which may enter the system from various sources, for example, as corrosion products or in fly-ash, can act to catalyze the oxidation reaction.

The oxidation of the sulfur dioxide for example into sodium bisulfate by whatever means will build-up excess acid into the overall system so that the reformed sulfate salt solution resulting from the neutralization step will have an acid pH. It is highly desirable that the sulfate solution be close to the neutral point (preferably having a pH in the range of 6 to 9) before it is recycled back as feed to the electrolytic cell. This excess acid upsets the stoichiometric balance and must be avoided, removed from the system or alternatively neutralized by the addition of an outside source of alkali.

It is therefore an object of the present invention to provide an improved cyclic electrolytic process for the liquid absorption of volatile acidic gases whereby the sulfate feed solution to the electrolytic cell is maintained essentially neutral by preventing the build-up of excess acid within the system.

Another object is to provide a process for the preferential reduction of residual oxidants in the absorption system to prevent or reduce the amount of acid produced from the oxidation of the sulfur dioxide gas.

Another object is to control the amount of residual oxygen in such a scrubber system by contacting said oxygen with easily oxidizable materials or agents.

Another object is to recover substantially all the absorbed sulfur dioxide as a concentrated sulfur dioxide gas stream.

A further object is to provide a process to allow controlled electrolytic reduction of the bisulfite of a laden caustic solution into a reducing agent for reuse of the same as an oxidant scavenger.

Various other objects and advantages will be apparent to one skilled in the art upon reading the following disclosure and the novel features will be particularly pointed out hereinafter in connection with the appended claims. It is understood that the details may be modified without departure from the principles of the invention which is readily understood when taken in connection with the accompanying drawing. For the purpose of simplicity the various valves, flowmeters, pressure gauges, pumps, switches, etc., which one skilled in the art might employ are not all fully illustrated in the drawing which is a diagrammatic representation of a simple absorption and regeneration system.

In general the present invention comprises a continuous self-regenerating liquid-phase sulfur dioxide absorption system employing a novel combination of four basic steps for controlled gas purification and for the recovery of a concentrated stream of sulfur dioxide from the system. The first step of a preferred embodiment involves the electrolytic conversion of an ammonium, magnesium or alkali metal sulfate salt (referred to hereinafter as sulfate salt) into its corresponding acidic and alkaline components in a multiple cell electrolytic plant. The second step involves the absorption in a contactor of sulfur dioxide from a gas stream (comprising sulfur dioxide and at least one other component for example oxygen which is capable of oxidizing sulfur dioxide) into the alkaline solution produced by the electrolytic cell; the said alkaline absorbing solution having dissolved therein a reducing agent. The reducing agent will preferentially react with those components dissolved in such alkaline solution (which are capable of oxidizing sulfur dioxide) to prevent or inhibit said oxidation thereof. The third step is directed to passing a portion (part but not all) of the laden alkaline (predominantly a bisulfite solution) to the cathode compartment of at least some of the electrolytic cells to electrolytically reduce bisulfite to reform the reducing agent. The remaining bisulfite laden alkali from the contactor is neutralized with the acidic anolyte product of the cells to reform the original sulfate salt and recover the stripped sulfur dioxide as a concentrated stream. In the fourth step, the resulting reformed sulfate solution is recycled (with or without concentration or dilution) as feed solution to the electrolytic cells for conversion once again to the respective acidic and alkaline solutions.

The present invention as disclosed herein inhibits or prevents the undesired sulfur dioxide oxidation process by employing reducing agents which are preferentially oxidized in place of the sulfur dioxide. Reducing agents such as sodium trithionate, sodium tetrathionate, sodium pentathionate, sodium hexathionate, sodium thiosulfate ($Na_2S_2O_3$), sodium dithionite ($Na_2S_2O_4$) and the like are preferably dissolved in the alkaline absorbing liquid. Where the reducing agent is a relatively insoluble solid of the polymeric resin type it is otherwise made to contact the alkaline absorbent solution. Such solid reducing agents may comprise polythiolstyrene resin, polyvinylhydroquinone resin, condensation type polymers of formaldehyde, phenol and hydroquinone, cuprous or ferrous complexed or chelated resins, electron exchange polymeric resins and the like. These resins per se are well known in the art.

The alkaline absorbing liquid of the scrubber system is generally recirculated through one or more stages of a contactor which allows substantial contact time between the alkaline absorbent and the sulfur dioxide containing waste gas stream. There results a relatively long interval on the average from the time an average molecule of sulfur dioxide is absorbed and the time it is released during the neutralization step and removed (stripped) from the scrubber system as a concentrated sulfur dioxide gas stream. Thus there is ample time for oxygen or other oxidizing agents which are usually dissolved in the absorbent liquid (approx. 0.1 milliequivalent of dissolved oxygen per liter of absorbent solution) or in the acidic anolyte used in the neutralization to react with and oxidize directly or indirectly the absorbed sulfur dioxide and ample time for additional oxygen coming in with waste gas stream to be dissolved into the liquid. To prevent this undesired oxidation of sulfur dioxide, the reducing agent may be added to the liquid feed to the contactor or to the recirculating absorbent stream, such agent being oxidized preferentially compared to sulfur dioxide or bisulfite. Where thiosulfate is the reducing agent the preferential oxidation is believed to take place according to the following reaction:

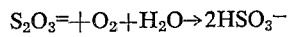
$$S_2O_3^= + O_2 + H_2O \rightarrow 2HSO_3^-$$

Where dithionite is the reducing agent which is dissolved in the absorbing solution the oxidizing reaction which may occur in the presence of sufficient reducing agent is probably the following:

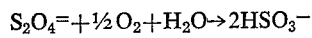
$$S_2O_4^= + \tfrac{1}{2}O_2 + H_2O \rightarrow 2HSO_3^-$$

In the use of such reducing agents the quantity of bisulfite formed may be electrolytically (cathodically) reduced and reformed into a reducing agent more susceptible to oxidation than bisulfite. This may be accomplished by bleeding a portion of the effluent from the absorber with or without additional sulfur dioxide and passing the same into the cathode compartment of some of the electrolytic cells wherein reduction occurs. The reducing agents formed thereby have not been unequivocally identified but without restricting the invention thereto, it is proposed that it may be substantially a dithionite salt formed according to the net reaction:

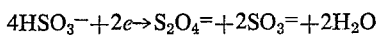
$$4HSO_3^- + 2e \rightarrow S_2O_4^= + 2SO_3^= + 2H_2O$$

Such resulting dithionite salt and/or other cathodically formed reducing agents are carried over with the alkaline catholyte solution into the contactor or absorber for reuse in the control of dissolved oxidants. The sulfite formed is available for sulfur dioxide absorption as shown by the reaction:

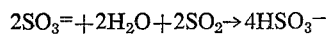
$$2SO_3^= + 2H_2O + 2SO_2 \rightarrow 4HSO_3^-$$

The process for carrying out the invention will be described by way of example by reference to the apparatus shown schematically in the drawing and in particular to the employment of a sodium sulfate salt as the feed solution to the electrolyte cell and the use of hydrosulfite as the reducing agent it being understood that as used herein "hydrosulfite" is intended to mean the reducing agent other than elemental hydrogen, formed by the electrolysis of a bisulfite containing solution at a cathode. In the practice of the invention, a substantially neutral feed solution of sodium sulfate is passed from line 42 by pump 43 to the electrolytic cell 1 and by means of a source of direct current impressed across the cell through leads 50 and 51 (source not shown) the sulfate feed material is split to result in the formation of primarily an acid sulfate solution and a hydroxide solution. The electrolytic cell is preferably of the type having three compartments, wherein the partition between the anode compartment 2 and the center feed compartment 3 is a diaphragm 4 of controlled porosity. Between the cathode compartment 5 and the center feed compartment 3 there is preferably a cation-permselective membrane 6 which prevents bulk mixing of the center and cathode compartment solutions. If desired, the cation permselective membrane can be replaced with a second controlled porosity diaphragm. The nonpermselective diaphragm 4 is of a design which will allow passage of bulk electrolyte solution therethrough being preferably of such suitable acid-resistant microporous materials as, for example, rubber, ceramic, polyethylene, polypropylene, Teflon and other synthetic fabrics.

The cation permselective membrane is in the form of a thin sheet substantially hydraulically impermeable to water and to ions carrying a negative charge but permeable to ions carrying a positive charge. The art contains many examples of cation exchange materials which can be formed into cation permselective membranes. Preferably, cation membrane 6 is a self supporting reinforced carboxylic acid type membrane such as that described in U.S. Pat. No. 2,731,408. Such carboxylic membranes, per se, may be manufactured by copolymerizing divinyl benzene and an olefinic carboxylic compound such as an anhydride, ester or acid chloride or acrylic acid and subsequently saturating the resulting product with water or an aqueous or alcoholic solution of an acid or base to convert the anhydride, ester or acid groupings in the polymeric matrix to salt or acid forms of carboxylate groups (—COO⁻ or —COOH). The solid products are most useful where the solvent of polymerization in the crosslinked structure is replaced by water to provide a solid structure which is electrically conductive and selectively permeable to cations. A cation permselective membrane of high selectivity is desired because the production efficiency of caustic is largely determined by the degree to which negatively charged hydroxide ions are prevented from migrating through the membrane. For example, if the carboxylic membrane is 80% selective then one mol of hydroxide ions is transferred from the cathode compartment and lost into the center compartment for every five moles of hydroxide ions produced at the cathode.

The anode compartment 2 is provided with an acid resistant anode 7 (for example, lead, lead alloys of silver, antimony, tellurium and/or thallium, Chilex, a tungsten bronze, platinum or platinum-coated electrolytic valve metals), which may be in the form of a sheet but is preferably perforated, expanded or in the form of a woven screen or closely spaced wires or rods, an outlet 8 for the anolyte liquid effluent product, outlet 9 for any gaseous anodic products which may form such as oxygen and inlet 60 for passage of recycled anolyte therein. The center feed compartment contains an inlet 10 through which the electrolyte feed solution is introduced.

The cathode compartment 5 defined from the center compartment 3 by the cation membrane 6 is provided with an alkali-resistant cathode 11 such as copper, lead or a lead alloy, nickel, iron or steel, which may be in the form of a sheet but is preferably in the form of an expanded sheet, woven screen or closely spaced wires, an inlet 12 through which a sulfate electrolyte or water is passed, and inlet 61 for recycling alkali back into the cathode compartment along with or without a portion of the bisulfite laden alkali removed the effluent stream 31 of the absorber 19. Outlet 13 of the compartment serves to withdraw the alkaline catholyte product, and outlet 14 removes gaseous cathodic products such as hydrogen. The diaphragm, membrane and electrode components may be separated from each other by thin, gasketed spacers (not shown) which form the fluid-containing compartments of the cell.

In operation, a sulfate solution (for example, sodium sulfate, potassium sulfate, ammonium sulfate or magnesium sulfate) is introduced by pressure means (such as a pump) into the center compartment through inlet 10 at a rate and pressure which in its passage through the porous diaphragm 4 (as shown by the arrow) is sufficient substantially to prevent fast-moving hydrogen ions formed at the anode from migrating to the cathode in competition with the passage of other cations into said cathode compartment from the center compartment. Simultaneously, electrolyte or preferably water, is introduced into the cathode compartment via inlet 12. Under the influence of an impressed direct electric current, cations of the electrolytic solution in the center compartment pass through the cation permselective membrane 6 into the cathode compartment. The combination of such cations with hydroxide ions produced at the cathode by the electrolysis of water forms an alkaline solution. This alkaline catholyte product is withdrawn through outlet 13 in a concentration dependent generally upon the current employed and the rate of liquid flow (such as water) into the cathode compartment.

The sulfate solution in the center compartment 3 having been partially depleted of its positive ions, passes through the porous diaphragm into the anode compartment where combination of the anionic sulfate groups and the anodically produced hydrogen ions forms an anolyte solution of the acid salt for example sodium bisulfate. This anolyte is withdrawn from the cell through outlet 8 and passed into the acid holdup, gas-liquid separation tank 36. The anolyte may be recycled back to the anode compartment through recirculation loop 37 by a pump 38. A stream of anolyte solution is bled and removed from the acid holdup tank 36 and passed through line 39 into the neutralizer-stripper tank 35. Within this tank the laden alkali from the absorber gas-liquid contactor 19 entering from line 31 will be neutralized by the acidic anolyte solution to form stoichiometrically the original sulfate feed solution. The resulting regenerated sulfate solution is removed from the neutralizer-stripper tank 35 by line 42 and passed by pumping means 43 as feed back to the cell preferably as an essentially neutral solution. During the neutralization reaction the sulfur dioxide is desorbed and recovered from tank 35 at exit line 44 as a substantially concentrated gas stream after first passing through a moisture-gas separator apparatus 45. The removal of the sulfur dioxide from the regenerated sulfate solution can be accelerated by use of a boiler or heater 46 to reboil and strip away the evolved sulfur dioxide gas. Other stripping means such as steam, vacuum, air or the like may also be employed in ways well known in the art. The regenerated sulfate solution is preferably passed through a filter 47 or other particle removing means before being returned as the feed solution to the electrolytic cell in order to minimize blinding of the porous diaphragm of the cell.

The effluent alkali from the cathode compartment 5 is passed via line 15 into the alkali holdup, gas-liquid separation tank 16, subsequently withdrawn through line 18 and introduced into the top of an absorber or gas-liquid contactor apparatus 19 and/or recycled through pump 24 back to the cathode compartment by way of recycle loop 20. The absorber 19 may be of conventional design such as a countercurrent packed or spray chamber. Simultaneously, a gas stream containing sulfur dioxide is introduced into the bottom of the tower through inlet gas line 21 by means of a gas blower 22 or other momentum producing means. The absorber is preferably operated countercurrently so as to allow contacting the gas having the least amount of sulfur dioxide with the most avid absorbing liquid. The descending alkali will absorb acidic substances such as sulfur dioxide and then collect in the bottom of the absorber at 25. The absorber can be designed so that the alkaline solution makes a single pass. To improve the performance of the scrubbing action the alkali can be continuously recirculated therethrough by pumping means 26, a portion of the liquid being removed from the bottom of the absorber and returned to inlet line 18 by means of return or recycle conduit 27. This recirculation provides continuous and thorough contact with the gas stream. It is during this absorption step and primarily within the absorber where a substantial portion of the previously described oxidation of sulfur dioxide will occur unless preventive steps are employed. To this end a reducing agent for example a dithionite or a thiosulfate is introduced into the absorber at any convenient point such as via inlet feed line 41 where the agent mixes with or otherwise intimately contacts the alkaline scrubbing solution. If preferred the reducing agent may be injected into the alkali recycle conduit 27 or added directly into the absorber sump.

After passing upwardly through the absorber, the gas, substantially depleted of sulfur dioxide is removed from the system at exit line 23 optionally after first passing through a liquid-gas separator 17 to remove entrained liquid droplets from the gas. Where a single pass of the laden gas is not sufficient to remove the desired percentage of sulfur dioxide, part of the gas may be recycled by a pump 29 back to the bottom of the tower for further scrubbing by way of return conduit 30. Preferably, at least 80% sulfur dioxide removal should be accomplished.

The laden alkali solution comprising mostly bisulfite and usually some unoxidized reducing agent is continuously bled from the absorber by outlet line 31. A small portion of the laden alkali is removed from outlet line 31 via line 32 and introduced directly into the cathode compartment of at least some of the electrolytic cells by pumping means 33 where it mixes with the alkali solution being recycled through line 20. The remaining portion of the laden alkali bled from the absorber via line 31 is passed by pump 34 directly into the neutralizer-stripper tank 35 where it mixes with the incoming acidic anolyte effluent solution from line 39.

Fresh alkali from the electrolytic cell is continuously passed into the absorber to make up for the laden solution removed through line 31. It is preferred that the alkali leaving the absorber be largely converted to bisulfite through the absorption of sulfur dioxide in accordance with the following reaction:

$$OH^- + SO_2 \rightarrow HSO_3^-$$

As previously stated a small portion of the sulfur dioxide laden alkali primarily in the form of bisulfite with or without additional free sulfur dioxide is bled from line 31 and passed into the cathode compartment of the electrolytic cell. Most of the bisulfite contained in this laden solution is formed from the absorption and reaction of sulfur dioxide with alkali. However the oxidation of the dithionate (and/or thiosulfate and/or other reduction products of bisulfite as the case may be) in its reaction with dissolved residual oxygen also will contribute to bisulfite formation. Within the cathode compartment the electrolytic reduction of bisulfite to dithionite and/or other reduction products of bisulfite will rapidly occur on contact with the cathode by way of illustration as follows:

$$4HSO_3^- + 2e \rightarrow S_2O_4^= + 2SO_3^= + 2H_2O$$

it being understood that the cathodically produced reducing agent may also contain thiosulfate, trithionate, tetrathionate, pentathionate, hexathionate and other unidentified reducing agents. The cathode reduction will result in the regeneration of the reducing agent accompanied by the formation of available alkali in the form of sulfite. This resulting catholyte mixture may be recycled through the cathode compartment by way of recycle conduit 20 until the desired reduction is accomplished so that at steady state the catholyte bleed stream 18 passing into the absorber will contain sufficient reformed reducing agent to react with and remove those oxidizing agents which may dissolve in the absorbing liquid. It is preferred to provide a sufficient excess of reducing agent to control any additional oxidizing agents which may be introduced into the neutralizer-stripper along with the acidic anolyte. Where the cathode reaction generates an ample quantity of reducing agent, the system will be self-sustaining and not require injecting additional reducing agent from a source outside the cyclic stream.

It will be understood that for practical and commercial applications a multiplicity of three compartment cells will be required to form the electrolytic conversion apparatus. Common electrodes may be used advantageously in the multicell apparatus in place of single electrodes where the preferably composite materials of electrode construction can withstand both anodic and cathodic attack. In common electrodes both sides of the electrode are taking part in the electrolytic process in contrast to single electrodes in which only a single side is actively involved. A preferred apparatus comprises a plurality of repeating cells placed adjacent to each other in a supporting structure wherein each electrode is placed common to two individual cells or units with the cathode and anodes arranged throughout the stack in an alternative fashion. A particularly advantageous multicell electrolytic apparatus is that described in copending application Ser. No. 625,149, now Pat. No. 3,475,122, utilizing bimetallic, bipolar electrodes placed common to two individual cells. A preferred electrode of the bimetallic type is one having a cathode surface on one side constructed of iron and the other side of an alloy containing approximately 88% lead, 10% silver and 2% tellurium.

An alternate manner of controlling the pH of the liquid scrubbing system while dispensing with the use of reducing agents is to employ a procedure for removing the excess acid (usually present in the form of bisulfate) from the overall system. Preferably the required amount of the acidic anolyte effluent solution is made to bypass the neutralizer-stripper apparatus and introduced into a crystallizer-evaporator apparatus to allow concentration of the acid sulfate solution. This concentration will result in the substantially complete crystallization and separation of sulfate salts from a mother liquid of sulfuric acid illustrated as follows in the case of sodium bisulfate.

$$2NaHSO_4 + 10H_2O \rightarrow Na_2SO_4 \cdot 10H_2O\downarrow + H_2SO_4$$

The mother liquid recovered will under the usual conditions existing in the crystallizer-evaporator apparatus be a weak acid of about 78% concentration. This acid which ideally represents the quantity of excess acid within the system is withdrawn from the overall scrubber system and may be sent for further concentration to an evaporator or preferably to a plant producing sulfuric acid by the oxidation of sulfur dioxide, for example, from recovered sulfur dioxide. The weak acid can be advantageously added to a higher strength acid to combine therewith and produce a resulting acid having a concentration of at least 97%. The concentrated sulfur dioxide stream recovered from the stripper apparatus may be oxidized to sulfur trioxide (as by the contact process) and absorbed into the resulting 97% plus acid to further increase its concentration. The sulfate crystals recovered in the crystallizer-evaporator may be redissolved in water and cycled back as part of the feed solution to the electrolytic cell or sent to the neutralizer-stripper tank to combine with the sulfate salt being reformed therein.

The pH level of the various aqueous solutions within the overall scrubber system may be continuously recorded and monitored to accomplish the removal of excess acid in an amount necessary to maintain stoichiometry within the system thtrough liquid flow control means to gauge the amount of acid which is removed or added back to the system to maintain the proper pH.

Another method of controlling the pH in the scrubber system is to employ a procedure for chemically neutralizing the excessive acidity which generally appears in the system in the form of bisulfate. As previously stated, this acidity develops from the undesired oxidation of sulfur dioxide as seen by the following equations which appear to cover the various reactions which may be occurring within the scrubber system:

(a) ELECTROLYTIC CELL $$4SO_4^= + 6H_2O \rightarrow 4HSO_4^- + 4OH^- + 2H_2\uparrow + O_2\uparrow$$

(b) ABSORPTION TOWER $$4OH^- + 3.6SO_2 + 0.1O_2 \rightarrow 3.2HSO_3^- + 0.2SO_3^= + 0.2SO_4^= + 0.4H_2O$$

(c) NEUTRALIZER-STRIPPER TOWER $$3.2HSO_3^- + 0.2SO_3^= + 0.2SO_4^= + 0.4H_2O + 4HSO_4^- \rightarrow 3.8SO_4^= + 3.8H_2O + 0.4HSO_4^- + 3.4SO_2\uparrow$$

(d) OVERALL SYSTEM $$4SO_4^= + 6H_2O + 3.6SO_2 + 0.1O_2 \rightarrow 3.8SO_4^= + 3.8H_2O + 0.4HSO_4^- + 3.4SO_2\uparrow + 2H_2\uparrow + O_2\uparrow$$

(e) NET CONVERSION $$0.2SO_4^= + 2.2H_2O + 0.2SO_2 + 0.1O_2 \rightarrow 0.4HSO_4^- + 2H_2\uparrow + O_2\uparrow$$

The 0.4 mole of bisulfate acidity ($HSO_4^-$) may be neutralized by the addition of an equivalent quantity of lime or ground limestone which is preferably added to the effluent of the neutralizer-stripper tank prior to passage of this effluent back to the electrolyte cell as a feed solution. This effluent solution will otherwise be acidic due to the excess acid sulfate which it contains and the addition of lime will result in aubstantially neutral feed solution according to the following reaction:

(f) LIME CONDITIONING $$0.4HSO_4^- + 0.2Ca(OH)_2 \rightarrow 0.2HSO_4^= + 2H_2O + 0.2CaSO_4\downarrow$$

The relatively insoluble $CaSO_4$ is first removed from the reformed sulfate solution before recycling the same as a feed solution to the cell. However because $CaSO_4$ has an inverse solubility characteristic the small amount of $CaSO_4$ remaining in solution can precipitate out of solution at various points within the system where there occurs an increase in temperature and/or concentration such as for example within the electrolytis cell or in the neutralizer-stripper apparatus.

To eliminate these shortcomings effluent obtained from the liming is preferably treated with small amounts of carbonate salts, e.g., of sodium, potassium, ammonium or magnesium for a combined lime-carbonate conditioning procedure so that the following reactions are believed to occur within the scrubber system:

(a) ELECTROLYTIC CELL $$3.6SO_4^= + 5.4H_2O \rightarrow 3.6HSO_4^- + 3.6OH^- + 1.8H_2\uparrow + 0.9O_2\uparrow$$

(a₁) LIME-CARBONATE CONDITIONING $$0.2SO_4^= + 0.2Ca(OH)_2 \rightarrow 0.4OH^- + 0.2CaSO_4\downarrow;$$
$$\text{trace } CaSO_4 + \text{trace } CO_3^= \rightarrow \text{trace } SO_4^= + \text{trace } CaCO_3\downarrow$$

(b) ABSORPTION TOWER $$4OH^- + 3.6SO_2 + 0.1O_2 \rightarrow 3.2HSO_3^- + 0.2SO_4^= + 0.4H_2O$$

(c) NEUTRALIZER-STRIPPER TOWER $$3.2HSO_3^- + 0.2SO_3^= + 0.2SO_4^= + 0.4H_2O + 3.6HSO_4^- \rightarrow 3.8SO_4^= + 3.8H_2O + 3.4SO_2\uparrow$$

(d) OVERALL SYSTEM $$3.8SO_4^= + 0.2Ca(OH)_2 + 5.4H_2O + 3.6SO_2 + 0.1O_2 + \text{trace } CO_3 \rightarrow 3.8SO_4^= + 3.8H_2O + 0.2CaSO_4\downarrow + \text{trace } CaCO_3\downarrow + 3.4SO_2\uparrow + 1.8H_2\uparrow + 0.9O_2\uparrow$$

(e) NET CONVERSION $$0.2Ca(OH)_2 + 1.6H_2O + 0.2SO_2 + 0.1O_2 + \text{trace } CO_3^= \rightarrow 0.2CaSO_4\downarrow + \text{trace } CaCO_3\downarrow + 1.8H_2 + 0.9O_2\uparrow$$

The lime-carbonate treatment removes trace amounts of $CaSO_4$ which would otherwise remain in solution when lime alone is employed. The use of carbonate will allow for the removal of dissolved calcium from the system in the form of a highly insoluble precipitate of calcium carbonate resulting in a solution having substantially no available ions for later precipitation within the scrubber system. The combined lime-carbonate treatment eliminates the excess acidity in the absorber which would otherwise result in a loss of caustic passed into the absorber tower. The size and capacity of the electrolytic cell plant can therefore be about 10% less where the lime-carbonate process is employed.

The following examples show by further illustrations and not by way of limitation the cyclic method of absorbing sulfur dioxide and the regeneration of the spent aqueous absorbent to form the original salt feed to the cell and the manner for maintaining pH control in the overall scrubber system.

EXAMPLE 1

An array of six electroyltic cells of the general type disclosed and described containing six lead 2% tellurium-1% silver anodes and six nickel cathodes is used to convert a 2 normal aqueous solution of sodium sulfate into sodium acid sulfate and sodium hydroxide. The diaphragms are microporous silicone rubber and have a thickness of 0.25 millimeter and are supported on their anode sides by woven glass cloth. The void volume of the diaphragm is about 70 percent and the average pore size is about 20 microns. The interior electrodes are bimetallic and bipolar, that is, they consist of a laminate of lead alloy and nickel. The active surfaces of all the electrodes are scribed to increase the effective surface area. The membrane is a self-supporting carboxylic type cation permselective membrane of the type described in U.S. Pat. No. 2,731,408, prepared from a mixture of divinyl benzene, ethyl styrene and acrylic acid. It has a thickness of 0.7 millimeter, an areal resistance of 2-ohm cm.² in 1 molar sodium hydroxide at 150° F., a water content of about 20 percent of its dry weight, a cation exchange capacity of about 6.5 milliequivalents per dry gram of resin, average pore sizes of less than 0.1 micron, a transport number for sodium ions of about 0.85 when in equilibrium with 1 molar sodium hydroxide, a Mullen A burst strength of about 80 pounds per square inch and is reinforced with two layers of bonded nonwoven polypropylene mat. The spacing between the diaphragm and the membrane is filled with nonwoven bonded polypropylene screen having a thickness of 2 millimeters. The outer edges of the compartments are fitted with high density polyethylene gaskets having a compressed thickness of about 2 millimeters. The sodium sulfate solution is introduced into the central compartments at a rate of 4 liters per hour per active square foot of anode. The current density at the anode and at the cathode is 120 amperes per square foot. The temperature of the cell is maintained at 150° F. by recirculating both the anolyte and the catholyte through heat exchangers. The voltage required is about 36 volts D.C. that is, about 6 volts per cell. At steady state the bleed from the anolyte is found to be essentially 1 molar sodium bisulfate indicating a current efficiency of about 90 percent. At the cathode, 4 liters of caustic per hour per square foot are removed from the recirculating catholyte stream and the volume is maintained by adding water. At steady state the catholyte bleed is found to have a concentration of about 1 equivalent per liter indicating a current efficiency of about 90 percent. The catholyte bleed is contacted countercurrently with a simulated flue gas having the following composition:

| Component: | Volume percent |
|---|---|
| $SO_2$ | 0.3 |
| $CO_2$ | 13.0 |
| $N_2$ | 74.0 |
| $O_2$ | 6.0 |
| $H_2O$ | 6.7 |

The contact is carried out in a first column packed with glass Raschig rings. The liquid and the gas flows and the height of the packing are adjusted to remove about 90 percent of the $SO_2$ and give a liquid effluent having an emperical composition corresponding to about 82 mol percent of sodium bisulfite and about 18 mol percent of sodium sulfite. The liquid effluent is mixed with the corresponding amount of anolyte from the electrolytic cell and passed downwardly through a second column packed with glass Raschig rings against an upward stream of air adjusted to give a gaseous effluent having the following range of analyses on a dry basis:

| Component: | Volume percent |
|---|---|
| $SO_2$ | 25 to 28 |
| $O_2$ | 19 to 12 |
| $N_2$ | 56 to 50 | and thus suitable for the manufacture of sulfuric acid using the contact process. Alternatively, the sulfur dioxide may be stripped by heating the bottom of the packed tower and/or reducing the pressure in the tower with a mechanical vacuum pump. The sodium sulfate leaving the bottom of the second column is diluted to about 2 equivalents of sodium per liter. If this neutralizer-stripper column is heated with live steam then the liquid effluent from the column is concentrated to about 2 equivalents of sodium per liter in a multiple effect evaporator. The condensate in the latter case is used as feed to the cathode compartments of the multiple electrolytic cell. The sodium sulfate effluent is found to contain about 0.08 equivalent of sodium bisulfate per liter corresponding to the oxidation of about five percent of the absorbed sulfur dioxide. Although the sodium sulfate effluent is still suitable for feed to the central compartments of the cell thereby completing the cyclic operation, it is found that upon each such cycle the acidity increases by about 0.08 equivalent per liter and the voltage of the electrolytic cells gradually increases to about 45 volts that is about 7.5 volts per cell apparently owing to partial conversion of the carboxylic membrane to the nonconducting hydrogen form. If approximately 2 normal aqueous sodium carbonate solution is added (about 0.04 liter per cycle per liter of sulfate feed solution) to maintain the pH in range of about 6 to 9 then the voltage can be maintained at about 36 volts, that is, at about 6 volts per cell but the volume of solution increases at the rate of about 4 percent per cycle. In the process described there is both a loss of recoverable sulfur dioxide and an electrolyte disposal requirement.

EXAMPLE 2

The apparatus of Example 1 is operated in that example except that 0.04 liter of a reducing agent of 1 molar sodium thiosulfate ("hypo") are added to each liter of catholyte bleed prior to contacting the later with the simulated flue gas stream. The sodium sulfate effluent from the second column is now found to contain about 0.02 equivalent of sodium bisulfate per liter, that is only about 25 percent of that found in Example 1. It is concluded by difference that the recovery of concentrated sulfur dioxide has increased substantially, that is, from about 95 percent to almost 99 percent. The acidity in the system may be controlled in the range of about 6 to about 9 by the addition of only about 0.01 liter of 2 normal aqueous sodium carbonate solution to each liter of sodium sulfate feed to the electrolytic cells. The voltage is maintained at about 36 volts (6 volts per cell) without noticeable trends in any direction upon repeated cycles. However it is found that the volume of feed solution increases by about 5 percent per cycle owing to the addition of both thiosulfate and carbonate solution. Thus only one of the problems encountered in the method of Example 1 has been solved.

EXAMPLE 3

Example 2 is repeated except that 0.08 liter of a reducing agent of 1 molar sodium dithionite are added to each liter of catholyte bleed prior to contacting the latter with the simulated flue gas stream. The sodium sulfate effluent from the second column is now found to contain about 0.01 equivalent of sodium bisulfate per liter, that is only about 12.5 percent of that found in Example 1. It is concluded by difference that the recovery of concentrated sulfur dioxide has increased substantially, that is, from about 95 percent to about 99 percent. The acidity in the system may be controlled in the range of about 6 to about 9 by the addition of only about 0.005 liter of 2 normal aqueous sodium carbonate solution to each liter of sodium sulfate feed to the electrolytic cells. The voltage is maintained at about 36 volts (6 volts per cell) without noticeable trends in any direction upon repeated cycles. However, it is found that the volume of feed solution increases by about 8.5 percent per cycle owing to the addition of both dithionite and carbonate solution. The sulfur dioxide recovery problem has been solved but the disposal problem remains.

EXAMPLE 4

In order to avoid the addition of carbonate (as in Example 1), of thiosulfate and carbonate (as in Example 2) or of dithionite and carbonate (as in Example 3) the apparatus of Example 1 is operated as described therein except that part of the liquid effluent from the first column (the absorber) is recirculated through one of the cathode compartments instead of water. Additional liquid effluent from the first column is added to the recirculated catholyte at a rate adjusted to maintain the pH of the bleed from the recirculating loop at less than 8.0. This bleed has an odor resembling hydrosulfite and is mixed with the bleed of alkali from the other five cathode compartments and contacted countercurrently with the simulated flue gas in the first column described above and in Example 1. It is found that during steady state operation it is necessary to pass between about ¼ and ⅓ of the effluent from the first column through the specified cathode compartment to maintain a pH less than 8.0. At steady state, the sodium sulfate effluent from the second column (neutralizer-stripper) is found to contain about 0.01 equivalents of sodium bisulfate per liter, that is only about 12.5 percent of that found in Example 1. It is concluded by difference that the recovery of concentrated sulfur dioxide has increased substantially, that is, from about 95 percent to about 99 percent. The acidity in the system may be controlled in the pH range of about 6 to about 9 by the addition of only about 0.005 liter of 2 normal aqueous sodium carbonate solution to each liter of sodium sulfate feed to the electrolytic cells. The voltage is maintained at about 36 volts (6 volts per cell) without noticeable trends in any direction upon repeated cycles. The volume of the feed solution increases by only about 0.5 percent per cycle owing to the addition of the carbonate solution. In this manner the required reducing agent for control of pH is made by the system without appreciable increase in cost or in complexity. Although the product of the cathodic reduction of bisulfite is called "hydrosulfite" herein for convenience it is undoubtedly a mixture of cathodic reduction products of bisulfite. It has been termed "hydrosulfite" herein because its reducing properties are similar to those of the sodium hydrosulfite of commerce. It is found that the oxidation of sulfur dioxide can be controlled similarly when the feed to the central compartments of the electrolytic cells is a solution of ammonium, potassium or magnesium sulfate. In the latter case it is found to be advantageous to use arrays of vertically oriented nickel, iron or steel wires as cathodes to facilitate release of the magnesium hydroxide formed. In this manner both problems of sulfur dioxide recovery and electrolyte disposal, have been solved.

EXAMPLE 5

The apparatus of Example 1 is operated as described in that example except that about 4 percent of the feed solution bypasses the electrolytic cells and is treated with slaked lime (calcium hydroxide) to precipitate calcium sulfate. A slight excess of calcium hydroxide is used over stoichiometry (about 75 grams per liter). The calcium sulfate is removed by filtration or centrifugation and sufficient 2 normal sodium carbonate solution is added to give a residual soluble calcium of less than 20 milligrams per liter. The calcium carbonate is removed by filtration or centrifugation and the resulting liquor is combined with the bleed from the cathode compartments and sent to the flue gas contact column (first column). It is found that the current density may be decreased by about 8 percent as compared to Example 1 while maintaining the same performance, that is supplying 4 liters of caustic per hour to the flue gas contact column for each square foot of cathode in the electrolytic cells. While the amount of feed which bypasses the cells is on the average about 4 percent, the exact quantity is varied from time to time to maintain the pH of the feed material between about 6 to 9. The sodium sulfate effluent from the second column is found to be substantially free of sodium bisulfate at steady state. The recovery of concentrated sulfur dioxide is about 95 percent of that absorbed. The voltage is maintained at about 36 volts (6 volts per cell) without noticeable trends in any direction upon repeated cycles. The volume of feed solution remains substantially constant. Thus the electrolyte disposal problem has been solved. This method is particularly useful when the recovered sulfur dioxide has low market value.

EXAMPLE 6

The apparatus of Example 1 is operated as described in that example except that a bleed of about 8 percent of the anolyte effluent is evaporated to a concentration which will just begin to crystallize at about 0° C., (generally about 250 grams per liter) and then chilled to about −10° C. Sodium sulfate decahydrate crystallizes out and is removed by filtration or centrifugation. The process is repeated until substantially all of the sodium values have been removed and the remaining sulfuric acid has a concentration of about 78 percent. It is then further concentrated to 98 percent by methods well-known in the art. Alternatively the 78 percent acid is added to a higher strength acid to produce acid having a concentration of at least 97 percent. The latter is then used to absorb sulfur trioxide produced from the sulfur dioxide evolved in the second column of Example 1 (the neutralizer-stripper column). The sodium sulfate recovered is returned with water as necessary to the feed solution to the electrolytic cells. Although the amount of anolyte which is removed from the system is on the average about 8 percent, the exact quantity is varied from time to time to maintain the pH of the feed material between about 6 and 9. The sodium sulfate effluent from the second column is found to be substantially free of sodium bisulfate at steady state. The recovery of concentrated sulfur dioxide is about 95 percent of that absorbed but the overall recovery of the sulfur value is essentially 100 percent of that absorbed. The voltage is maintained at about 36 volts (6 volts per cell) without noticeable trends in any direction upon repeated cycles. The volume of feed solution remains substantially constant. Thus both the sulfur recovery and electrolyte disposal problems have been solved. This method is particularly applicable to larger sulfur dioxide control plants and may be used with the other sulfate salts.

EXAMPLE 7

The apparatus of Example 1 is operated as descirbed in that example except that the catholyte bleed is recirculated countercurrently around the first column (absorber) passing first through a third (scavenger) column of redox resin before returning to the absorber column thus constituting an oxidant scavenger loop. The overflow from this loop is laden with bisulfite (approximately 82 mol percent bisulfite and about 18 mol percent sulfite) and is combined with the anolyte bleed and sent to the second (neutralizer-stripper) column as described in Example 1. The redox resin is an insoluble apparently cross-linked polythiolstyrene prepared from polystyrene according to the method of H. P. Gregor et al., J. Am. Chem Soc. 77, 3675 (1955). From time to time it is regenerated by rinsing with boiled, deaerated water, then circulating a warm one molar solution of sodium hypophospite through the resin for about 30 minutes and finally rinsing again with boiled deaerated water. The resin may also be regenerated with thioglycolic acid (at pH 8), sodium sulfide or sodium hydrosulfite. The latter is particularly advantageous since the partially spent hydrosulfite can be regenerated electrolytically in electrolytic cells reserved for that purpose or in the cathodes of some of the cells. It can also be regenerated by treatment with zinc dust. It is found that the sodium sulfate effluent from the second column is found to contain about 0.01 equivalents of sodium bisulfate per liter, that is, only about 12.5 percent of that found in Example 1. It is concluded by difference that the recovery of concentrated sulfur dioxide has increased substantially, that is, from about 95 percent to about 99 percent. The acidity in the system may be controlled in the pH range of about 6 to about 9 by the addition of only about 0.005 liter of 2 normal aqueous sodium carbonate solution to each liter of sodium sulfate feed to the electrolytic cells. The voltage is maintained at about 36 volts (6 volts per cell) without noticeable trends in any direction upon repeated cycles. The volume of feed solution remains substantially constant. The sulfur dioxide recovery and electrolyte disposal problems have been solved by this means.

I claim:
1. A process for the removal of sulfur dioxide from a gaseous mixture containing the same with subsequent recovery of substantially all the removed sulfur dioxide in the form of a relatively concentrated stream which process comprises the steps of:
 (a) partially converting an aqueous feed solution of a sulfate salt selected from the group consisting of sodium, potassium, ammonium and magnesium sulfate into its corresponding acidic and alkaline solutions by introducing said feed solution into at least the center compartment of a three compartment electrolytic cell wherein the center compartment is disposed between a cathode containing electrode compartment and an anode containing electrode compartment, said center compartment separated from the adjacent anode compartment by a liquid permeable microporous diaphragm and from the adjacent cathode compartment by a cation permselective membrane, maintaining sufficient pressure in said center compartment to cause the feed solution to pass through said porous diaphragm into the adjacent anode compartment, introducing an aqueous feed liquid into said cathode compartment, passing a direct electric current across the electrodes transversely through said compartments to produce an alkaline solution at said cathode and an acidic solution at said anode;
 (b) contacting the effluent alkaline solution of said cathode compartment with said gaseous mixture to react with and absorb sulfur dioxide, the said alkaline solu- tion being in contact with a reducing agent which oxidizes preferentially over sulfur dioxide whereby said reactions result in a solution comprised predominately of bisulfite salt;

(c) combining said bisulfite salt with the said acidic solution produced at said anode whereby the reaction results in reforming a solution of sulfate salt accompanied by the desorption of sulfur dioxide;

(d) passing said reformed sulfate salt back as feed solution to said electrolytic cell to complete the cyclic process after first substantially stripping off and collecting the desorbed sulfur dioxide.

2. The process according to claim 1 characterized in that the sulfate salt comprises sodium sulfate, the alkaline solution comprises sodium hydroxide, the bisulfite salt comprises predominately sodium bisulfite and the reducing agent is selected from the group consisting of sodium thiosulfate, sodium dithionate, electrolytic reduction product of sodium bisulfite and mixtures thereof.

3. The process according to claim 1 characterized in that a portion of said predominately bisulfite salt solution is introduced into the cathode compartment of at least one of said three compartment electrolytic cells whereby a reduction product of said bisulfite salt is produced which product is more susceptible to oxidation than said bisulfite salt.

4. The process according to claim 1 characterized in that the aqueous feed liquid introduced into said cathode compartment is water.

5. The process according to claim 1 characterized in that the reducing agent is a solid insoluble polymeric resin selected from the group consisting of polythiolstyrene resin, polyvinylhydroquinone resin, formaldehyde-phenolhydroquinone resin, cuprous complexed resin, ferrous complexed resin and electron exchange resin.

6. The process according to claim 1 characterized in that the sulfate salt feed solution to the electrolytic cell is between a pH of 6 to 9.

7. A process for the removal of sulfur dioxide from a gaseous mixture containing the same with subsequent recovery of substantially all the removed sulfur dioxide in the form of a relatively concentrated stream which process comprises the steps of:

(a) partially converting an aqueous feed solution of a sulfate salt selected from the group consisting of sodium, potassium, ammonium and magnesium sulfate into its corresponding acidic and alkaline solutions by introducing said feed solution into at least the center compartment of a three compartment electrolytic cell wherein the center compartment is disposed between a cathode containing electrode compartment and an anode containing electrode compartment, said center compartment separated from the adjacent anode compartment by a liquid permeable microporous diaphragm and from the adjacent cathode compartment by a cation permselective membrane, maintaining sufficient pressure in said center compartment to cause the feed solution to pass through said porous diaphragm into the adjacent anode compartment, introducing an aqueous feed liquid into said cathode compartment, passing a direct electric current across the electrodes transversely through said compartments to produce an alkaline solution at said cathode and an acidic solution at said anode;

(b) absorbing the sulfur dioxide of said gaseous mixture into said alkaline catholyte solution to form a solution of predominately bisulfite salt;

(c) combining a major portion of said anolyte effluent solution with said bisulfite salt solution whereby the reaction results in reforming a solution of sulfate salt accompanied by desorption of sulfur dioxide, said sulfur dioxide being stripped off and recovered as a relatively concentrated stream;

(d) subjecting a minor portion of said anolyte effluent solution to alternate evaporation and chilling to crystallize and recover sulfate salt from a mother liquor of sulfuric acid, said recovered sulfate salt being redissolved and reused as part of said sulfate feed solution to the cell;

(e) withdrawing said sulfuric acid mother liquid from the overall scrubber system in an amount sufficient to maintain the pH of the said sulfate feed solution between about 6 and 9 and adding said acid to a higher strength acid to combine with and produce a resulting acid having a concentration of at least 97%.

8. The process according to claim 7 characterized in that at least a portion of the recovered concentrated stream of sulfur dioxide is oxidized to sulfur trioxide with the sulfur trioxide then being absorbed in said resulting acid having a concentration of at least 97% to further increase the said acid concentration.

9. A process for maintaining pH control in a cyclic scrubber system for the removal of sulfur dioxide from an oxygen containing gas mixture comprising the steps of:

(a) partially converting an aqueous feed solution of a sulfate salt selected from the group consisting of sodium, potassium, ammonium and magnesium sulfate into its corresponding acidic and alkaline solutions by introducing said feed solution into at least the center compartment of a three compartment electrolytic cell wherein the center compartment is disposed oetween a cathode containing electrode compartment and an anode containing electrode compartment, said center compartment separated from the adjacent anode compartment by a liquid permeable microporous diaphragm and from the adjacent cathode compartment by a cation permselective membrane, maintaining sufficient pressure in said center compartment to cause the feed solution to pass through said porous diaphragm into the adjacent anode compartment, introducing an aqueous feed liquid into said cathode compartment, passing a direct electric current across the electrodes transversely through said compartments to produce an alkaline solution at said cathode and an acidic solution at said anode.

(b) absorbing the sulfur dioxide of said gas mixture into said alkaline catholyte product to form a solution of predominately bisulfite salt;

(c) combining said anolyte effluent solution with said bisulfite salt solution whereby the reaction results in forming of an acidic solution of sulfate salt accompanied by desorption of sulfur dioxide, said sulfur dioxide being stripped off and recovered as a relatively concentrated stream;

(d) adding lime to a portion of said reformed sulfate salt solution to effect the substantial precipitation of the sulfate contained therein as relatively insoluble calcium sulfate;

(e) and clarifying said limed sulfate solution before passing the same back as a feed solution to the electrolytic cell thereby completing the cyclic process.

10. The process according to claim 9 characterized in that soda ash is added to the limed solution after clarification whereby additional calcium salts are precipitated out of solution primarily in the form of calcium carbonate.

References Cited
UNITED STATES PATENTS

| | | | |
|---|---|---|---|
| 2,768,945 | 10/1956 | Shapiro | 204—72 |
| 3,135,673 | 6/1964 | Tirrell et al. | 204—98 |
| 3,165,460 | 1/1965 | Zane et al. | 204—301 |
| 3,222,267 | 12/1965 | Tirrell et al. | 204—98 |
| 3,344,050 | 9/1967 | Mayland et al. | 204—98 |
| 3,433,726 | 3/1969 | Parsi et al. | 204—180 |

JOHN H. MACK, Primary Examiner

A. C. PRESCOTT, Assistant Examiner

U.S. Cl X.R.

23—2; 204—92, 98, 104, 180